US011898516B2

(12) United States Patent
Bazyn et al.

(10) Patent No.: US 11,898,516 B2
(45) Date of Patent: Feb. 13, 2024

(54) CYLINDER HEAD HAVING BORE LOCATIONS ARRANGED FOR TIGHT PACKAGING OF GAS EXCHANGE AND FUEL SYSTEM COMPONENTS

(71) Applicant: Caterpillar Inc., Peoria, IL (US)

(72) Inventors: Timothy Adam Bazyn, Chillicothe, IL (US); Kevin Weiss, Peoria, IL (US); Brenton William Bush, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 155 days.

(21) Appl. No.: 17/412,137

(22) Filed: Aug. 25, 2021

(65) Prior Publication Data

US 2023/0077087 A1 Mar. 9, 2023

(51) Int. Cl.

*F02F 1/24* (2006.01)
*F02F 1/42* (2006.01)
*F02M 61/14* (2006.01)

(52) U.S. Cl.

CPC ............ *F02F 1/242* (2013.01); *F02F 1/4285* (2013.01); *F02M 61/14* (2013.01); *F02F 2200/06* (2013.01); *F02M 2200/855* (2013.01)

(58) Field of Classification Search

CPC .. F02F 1/242; F02F 1/42; F02F 1/4285; F02F 1/4292; F02F 2200/06; F02M 61/14; F02M 2200/855

See application file for complete search history.

(56) References Cited

U.S. PATENT DOCUMENTS 4,487,178 A 12/1984 Lehmann et al.
5,676,107 A * 10/1997 Yuzuriha ............... F02F 1/4228 123/308
5,983,843 A * 11/1999 Suzuki ...................... F01P 3/16 123/41.82 R (Continued)

FOREIGN PATENT DOCUMENTS

DE 19720898 A1 12/1997
EP 1344930 9/2003

(Continued)

OTHER PUBLICATIONS

Placeholder, Influence of modern diesel cold start systems on the cold start, warm-up and emissions of diesel engines, as early as May 6, 2021, Beru Ag, Ludwigsburg, Germany.

(Continued)

*Primary Examiner* — Grant Moubry
(74) *Attorney, Agent, or Firm* — Brannon Sowers & Cracraft PC

(57) ABSTRACT

A cylinder head includes a cylinder head casting having four gas exchange openings formed in a fire deck. A bolt bore and a glow plug bore extend through the cylinder head casting between an upper surface and a lower surface. The four gas exchange openings are arranged at twelve o'clock, three o'clock, six o'clock, and nine o'clock positions, circumferentially around an injector bore center axis. The bolt bore is positioned angularly between the twelve o'clock position and the three o'clock position, and the glow plug bore is positioned angularly between the three o'clock position and the six o'clock position.

19 Claims, 9 Drawing Sheets

(56) References Cited

U.S. PATENT DOCUMENTS

| | | | | | |
|---|---|---|---|---|---|
| 6,009,849 | A * | 1/2000 | Yamamoto | F02B 31/085 | 123/298 |
| 6,125,807 | A * | 10/2000 | Nishi | F01L 1/185 | 123/90.27 |
| 6,170,467 | B1 | 1/2001 | Girard | | |
| 8,544,450 | B2 * | 10/2013 | Megel | F02F 1/242 | 123/169 CA |
| 8,899,207 | B2 * | 12/2014 | Megel | F02F 1/4214 | 123/193.5 |
| 9,109,557 | B2 | 8/2015 | Legrand et al. | | |
| 9,228,531 | B2 | 1/2016 | Ness et al. | | |
| 9,234,451 | B2 | 1/2016 | Karch et al. | | |
| 9,879,590 | B2 | 1/2018 | Uehara et al. | | |
| 9,897,060 | B2 | 2/2018 | Wunderlich et al. | | |
| 10,519,914 | B2 | 12/2019 | Fitzner et al. | | |
| 10,590,896 | B2 | 3/2020 | Soriani | | |
| 2003/0145833 | A1 | 8/2003 | Wagner et al. | | |
| 2011/0232592 | A1 * | 9/2011 | Taki | F02F 1/28 | 123/41.42 |
| 2013/0042836 | A1 | 2/2013 | Trembath et al. | | |
| 2015/0007785 | A1 * | 1/2015 | Hosokawa | F02F 1/242 | 123/41.79 |
| 2015/0184578 | A1 * | 7/2015 | Oda | F02B 19/18 | 123/260 |
| 2019/0292978 | A1 | 9/2019 | Page et al. | | |

FOREIGN PATENT DOCUMENTS

| | | | | |
|---|---|---|---|---|
| GB | 2504315 | A | 1/2014 | |
| IN | 0705/MUM/2014 | A | 10/2015 | |
| JP | 11324865 | A | 11/1999 | |
| JP | 2000303843 | A * | 10/2000 | F02F 1/4214 |
| KR | 200203465 | Y1 | 3/2001 | |
| KR | 100398152 | B1 | 9/2003 | |
| WO | 2016008055 | A1 | 1/2016 | |

OTHER PUBLICATIONS

Examination Report for Int'l. Patent Appln. No. 22187987.7, dated Jan. 1, 2023 (6 pgs).

* cited by examiner

CYLINDER HEAD HAVING BORE LOCATIONS ARRANGED FOR TIGHT PACKAGING OF GAS EXCHANGE AND FUEL SYSTEM COMPONENTS

TECHNICAL FIELD

The present disclosure relates generally to a cylinder head, and more particularly to a cylinder head having gas exchange openings arranged with a bolt bore and glow plug bore for tight packaging of components in a cylinder head assembly.

BACKGROUND

Internal combustion engines are well-known and widely used throughout the world for diverse purposes ranging from vehicle propulsion and on-highway, off-highway, and marine applications to electrical power generation and operation of pumps, compressors, and all manner of industrial equipment. Many internal combustion engines can be classified generally based upon the manner in which a fuel is ignited in the engine. In spark-ignited engines an electrical spark is used to trigger ignition of a liquid fuel or a gaseous fuel at a desired timing. In compression-ignition engines in-cylinder pressure is increased to an autoignition threshold at which the fuel ignites without an additional external input of energy. A great many different variations and permutations of these general strategies including prechamber ignition, liquid fuel pilot ignition, and still others have been developed over the years.

In recent years increased research and development, especially in the case of compression-ignition engines, has been directed at increasing power density. Power density can be generally defined as the amount of output power that can be generated per unit volume of an engine. Relatively greater power density enables an engine to produce a given output power in a smaller spatial envelope with the attendant advantages of reduced weight and potentially reduced materials cost in engine construction. A multitude of commercial and practical advantages can be realized by employing engines with relatively greater power density as compared to predecessor platforms.

Efforts at increased power density have focused on a multitude of different improvements to features and operating aspects of engines, but have often created new challenges. In certain instances, increasing an amount of fuel that can be injected in an engine cycle can enable more fuel to be burned and thus increase power output of an engine of a given engine size. Increased fuel injection amounts, however, can require extremely high injection pressures and specialized equipment for handling highly pressurized fuel. Increased fuel injection amounts can also require enhanced cooling strategies to dissipate increased heat. Whenever combustion temperatures are elevated, as is commonly the case with high power density engines, component materials, placement, and component geometry may need to be carefully tailored to avoid overheating and/or thermal fatigue phenomena. Strategies for enhanced cooling or other temperature management schemes have also focused upon structures within combustion cylinders, including features of engine pistons and fuel injectors. In still other aspects, the organization and arrangement of certain components in a cylinder head assembly, such as the locations of glow plugs and other components can be important to engine performance and packaging efficiency, especially in high power density engine platforms.

SUMMARY

In one aspect, a cylinder head includes a cylinder head casting having an upper surface, a lower surface forming a fire deck, and having formed therein an injector bore defining an injector bore center axis and extending through the cylinder head casting between the upper surface and the lower surface, and four gas exchange openings in the fire deck. The cylinder head casting further has formed therein a bolt bore defining a bolt bore center axis parallel to the injector bore center axis, and a glow plug bore extending through the cylinder head casting between the upper surface and the lower surface. The four gas exchange openings are arranged at twelve o'clock, three o'clock, six o'clock, and nine o'clock positions, respectively, circumferentially around the injector bore center axis. The bolt bore originates in the upper surface and terminates at a location inward of the lower surface, and is positioned angularly between the twelve o'clock position and the three o'clock position, circumferentially around the injector bore center axis. The glow plug bore originates in the upper surface and terminates in the lower surface, and is positioned angularly between the three o'clock position and the six o'clock position, circumferentially around the center axis.

In another aspect, an engine system includes an engine housing having a cylinder block and a cylinder head forming a combustion cylinder. A piston is movable in the combustion cylinder between a bottom dead center position and a top dead center position to increase in-cylinder pressure to an autoignition threshold for air and an injected liquid fuel. The engine system further includes a fuel injector having a nozzle tip within the combustion cylinder, and spray outlets formed in the nozzle tip. The cylinder head includes an upper surface, a lower surface forming a fire deck, and has formed therein an injector bore defining an injector bore center axis, and four gas exchange openings in the fire deck. The four gas exchange openings are arranged at twelve o'clock, three o'clock, six o'clock, and nine o'clock positions, respectively, circumferentially around the injector bore center axis. The cylinder head further has formed therein a bolt bore defining a bolt bore center axis, positioned angularly between the twelve o'clock position and the three o'clock position, circumferentially around the injector bore center axis, and a glow plug bore positioned angularly between the three o'clock position and the six o'clock position, circumferentially around the center axis. A clamp is coupled to the fuel injector, and a bolt within the bolt bore extends through the clamp to clamp the fuel injector to the cylinder head within the injector bore.

In still another aspect, a cylinder head includes a cylinder head casting having an upper surface, a lower surface forming a fire deck, and having formed therein an injector bore defining an injector bore center axis and extending through the cylinder head casting between the upper surface and the lower surface, and four gas exchange openings in the fire deck. The cylinder head casting further has formed therein a bolt bore defining a bolt bore center axis parallel to the injector bore center axis. The four gas exchange openings are arranged at twelve o'clock, three o'clock, six o'clock, and nine o'clock positions, respectively, circumferentially around the injector bore center axis. The bolt bore is positioned angularly between the twelve o'clock position and the three o'clock position, circumferentially around the injector bore center axis, and is closer to the twelve o'clock position than to the three o'clock position.

DETAILED DESCRIPTION

Figure 1:
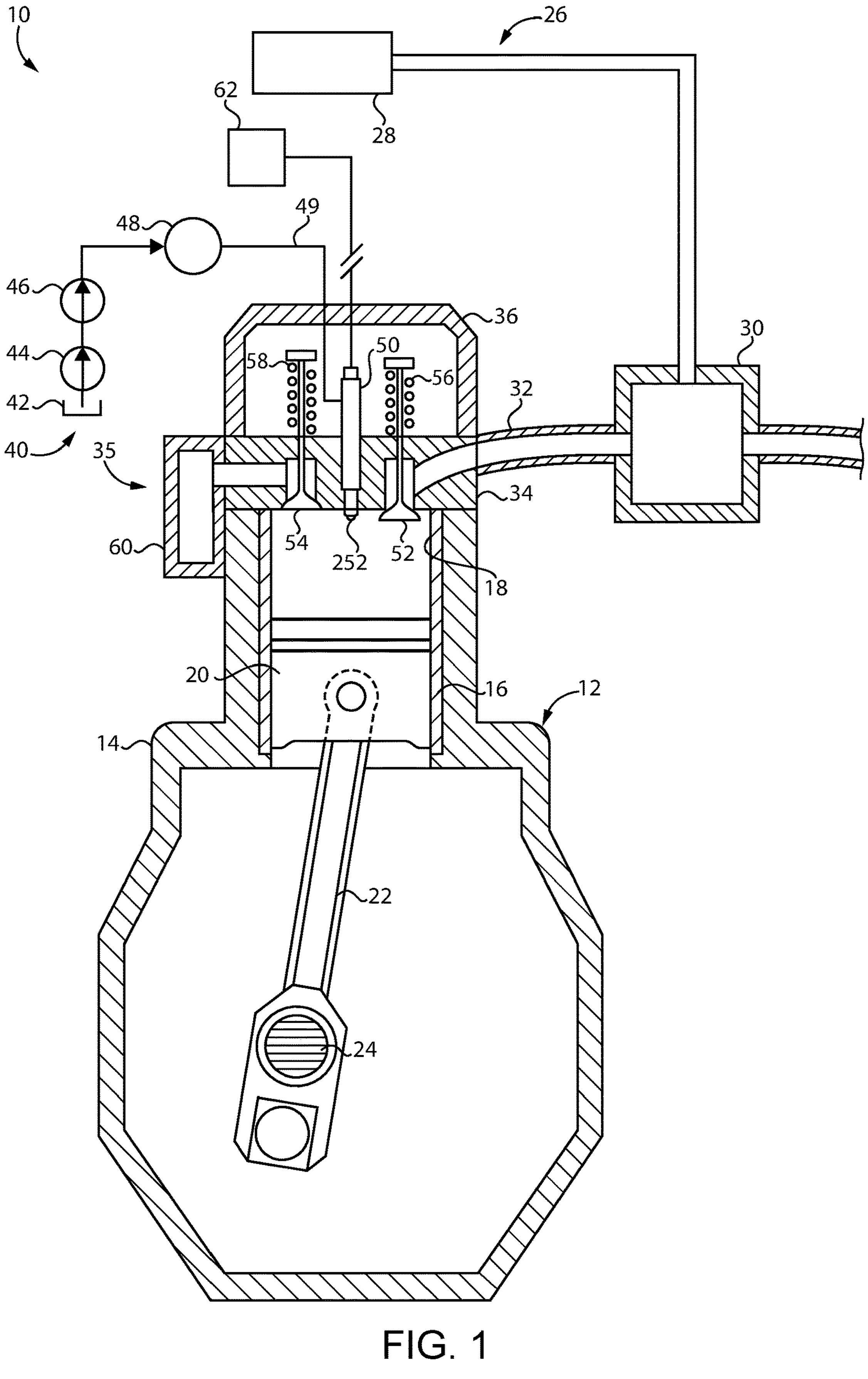
FIG. 1 is a diagrammatic view of an internal combustion engine system, according to one embodiment.

Referring to FIG. 1, there is shown an internal combustion engine system 10 according to one embodiment. Engine system 10 includes an engine 12 having a cylinder block 14 with a combustion cylinder 18 formed therein, within a cylinder liner 16 in the illustrated embodiment. Components of engine 12 including cylinder block 14, cylinder liner 16, and a cylinder head 34 together form an engine housing. A piston 20 is movable within combustion cylinder 18 between a bottom-dead-center position and a top-dead-center position to increase a pressure within combustion cylinder 18 to an autoignition threshold for injected liquid fuel and air, as further described herein. Piston 20 is coupled to a connecting rod 22, in turn coupled to a crankshaft 24 in a generally conventional manner, to power a load such as an electrical generator, a pump, a compressor, or for propelling a vehicle, to name a few examples. In a practical implementation engine system 10 is operated in a conventional four-stroke engine cycle. Combustion cylinder 18 may be one of any number of combustion cylinders in engine 12, in any suitable arrangement, such as an in-line pattern, a V-pattern, or still another. Engine system 10 may include a compression-ignition engine system, configured for improved power density, efficiency, and reduced emissions along with other properties as will be further apparent from the following description.

Engine system 10 further includes an intake system 26 having an air inlet 28, and an intake manifold 30 structured to receive a flow of filtered intake air from air inlet 28 and convey the same by way of an intake runner 32 to cylinder head 34 in a cylinder head assembly 35. Additional intake runners can be structured to supply a feed of intake air to other combustion cylinders in engine 12. In a practical implementation, the intake air may be compressed by way of a turbocharger compressor in a generally conventional manner. In addition to intake air recirculated exhaust gas could be supplied into a feed of compressed air conveyed to combustion cylinder 18. Engine system 10 further includes an exhaust manifold 60 structured to receive exhaust from combustion cylinder 18. In FIG. 1 an intake valve 52 coupled with a valve return spring 56 is supported in cylinder head 34 to open and close fluid communications between intake runner 32 and combustion cylinder 18. An exhaust valve 54 is similarly supported in cylinder head 34 and coupled with a valve return spring 58 to control fluid communications between combustion cylinder 18 and exhaust manifold 60. In a typical implementation two exhaust valves and two intake valves will be associated with combustion cylinder 18. A valve cover 36 may be attached to cylinder head 34, again in a generally conventional manner.

Engine system 10 further includes a liquid fuel system 40 having a fuel supply or tank 42, and in the illustrated embodiment a low-pressure pump 44 structured to transfer a liquid fuel from fuel tank 42 to a high-pressure pump 46 that pressurizes the transferred liquid fuel to an injection pressure. High-pressure pump 46 may feed a common rail or other pressurized fuel reservoir 48, and a fuel conduit 49 extends from pressurized fuel reservoir 48 to a fuel injector 50 supported in cylinder head 34. The liquid fuel may be any suitable compression ignition liquid fuel such as a diesel distillate fuel, other liquid compression ignition fuels or blends, or a liquid fuel with a cetane enhancer, for instance. Fuel injector 50 may be electronically controlled and will typically include a solenoid-actuated control valve (not shown) operably coupled to an outlet check (not shown) such as a direct controlled needle check. Additional or alternative internal fuel injector components could be used, and the present disclosure is not limited with regard to the internal valve components manner, or control of fuel injector operation. In other embodiments a cam-actuated or hydraulically actuated unit pump fuel injector could be used. An electronic control unit 62 is in control communication with fuel injector 50, and may also be in communication with high-pressure pump 46 and various other apparatus in engine system 10 including sensors, actuators, or still others.

Figure 2:
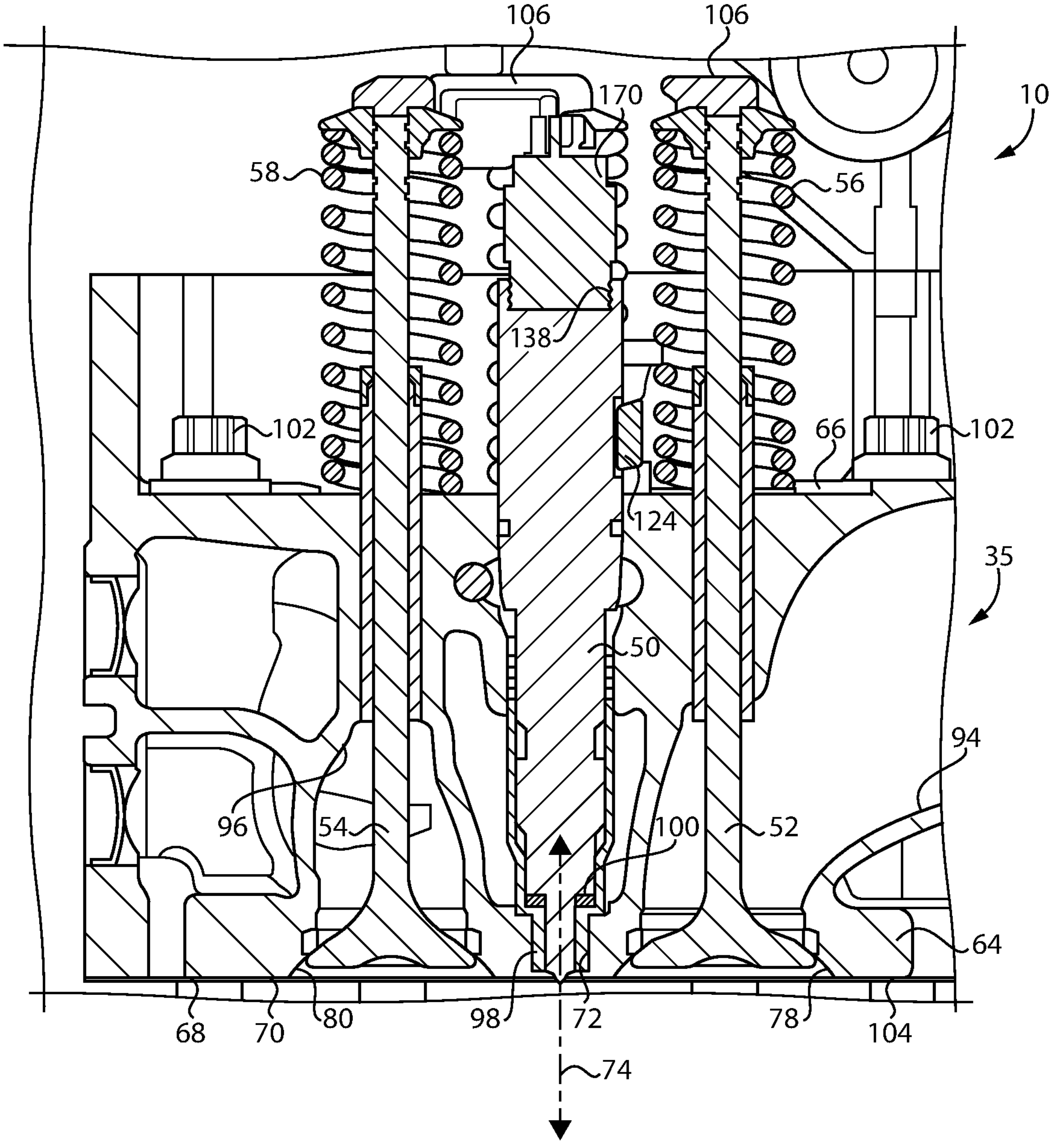
FIG. 2 is a sectioned side diagrammatic view of an internal combustion engine system, according to one embodiment.

Referring also now to FIG. 2, there are shown additional features of engine system 10, and notably those of cylinder head assembly 35. Cylinder head 34 may include a one-piece cylinder head casting 64 having an upper surface 66, and a lower fire deck surface 68 forming a fire deck 70. A head gasket 104 may be clamped between cylinder head 34 and cylinder block 14. Also depicted in FIG. 2 is a valve bridge 106 coupled to exhaust valve 54, and to another exhaust valve not visible in FIG. 2. Another valve bridge, also labeled with a reference numeral 106, is analogously coupled to intake valve 52 and to another intake valve not visible in FIG. 2. An intake conduit 94 is formed in cylinder head casting 64 and coveys an incoming flow of compressed intake air, or compressed intake air and other gases such as recirculated exhaust gas, to combustion cylinder 18. An exhaust conduit 96 is also formed in cylinder head casting 64 and conveys an outgoing flow of exhaust from combustion cylinder 18 to exhaust manifold 60. It can also be seen from FIG. 2 that fuel injector 50 is received in an injector sleeve 98, and a crush washer 100 is positioned between fuel injector 50 and injector sleeve 98. Bolts 102 clamp cylinder head casting 64 to cylinder block 14.

Figure 3:
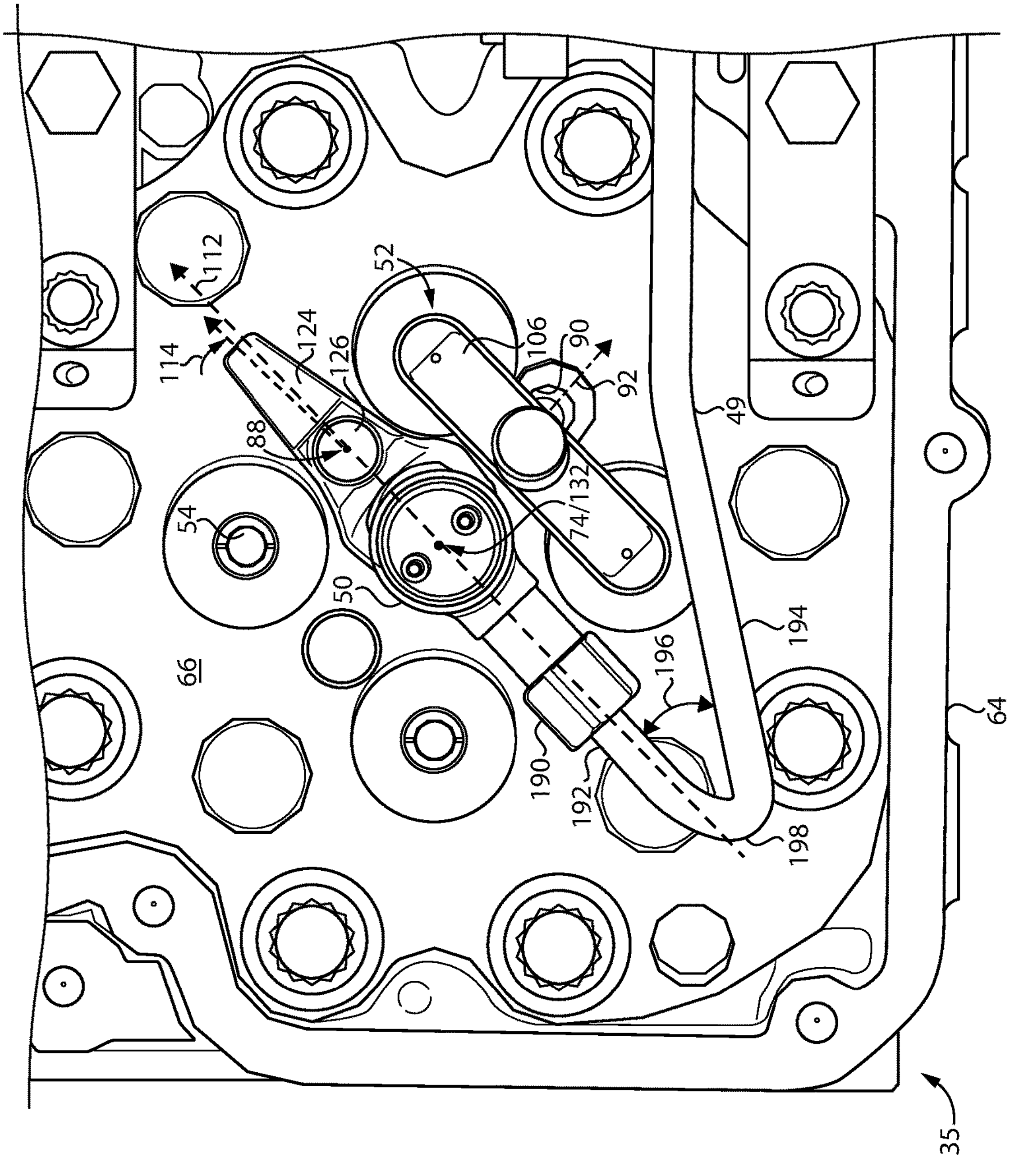
FIG. 3 is a top view of a cylinder head assembly, according to one embodiment.
Figure 4:
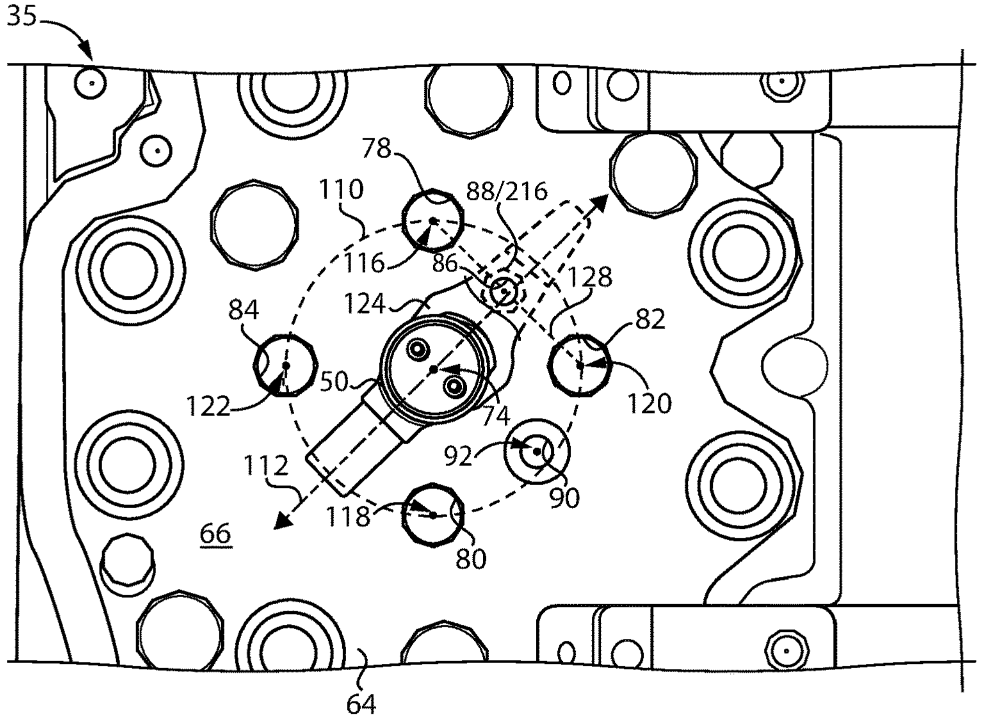
FIG. 4 is a top view of a cylinder head assembly, according to one embodiment.
Figure 5:
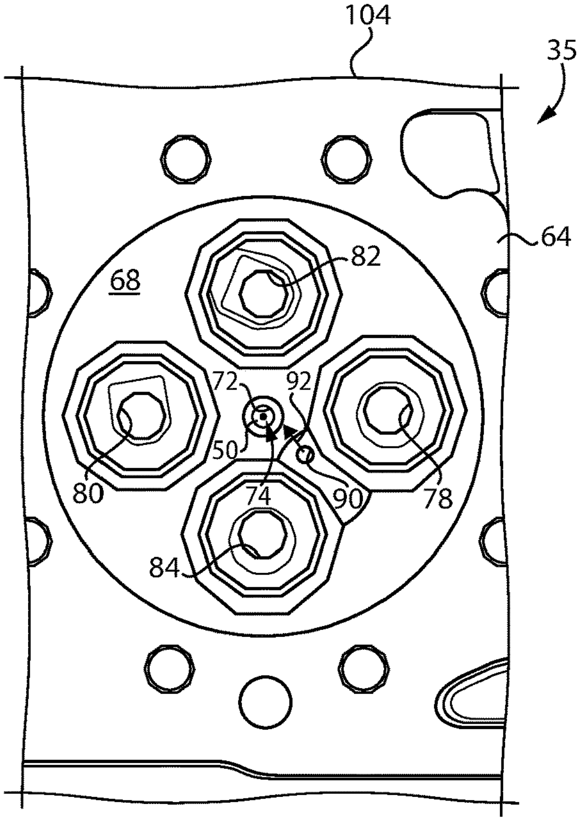
FIG. 5 is a bottom view of a cylinder head assembly, according to one embodiment.
Figure 6:
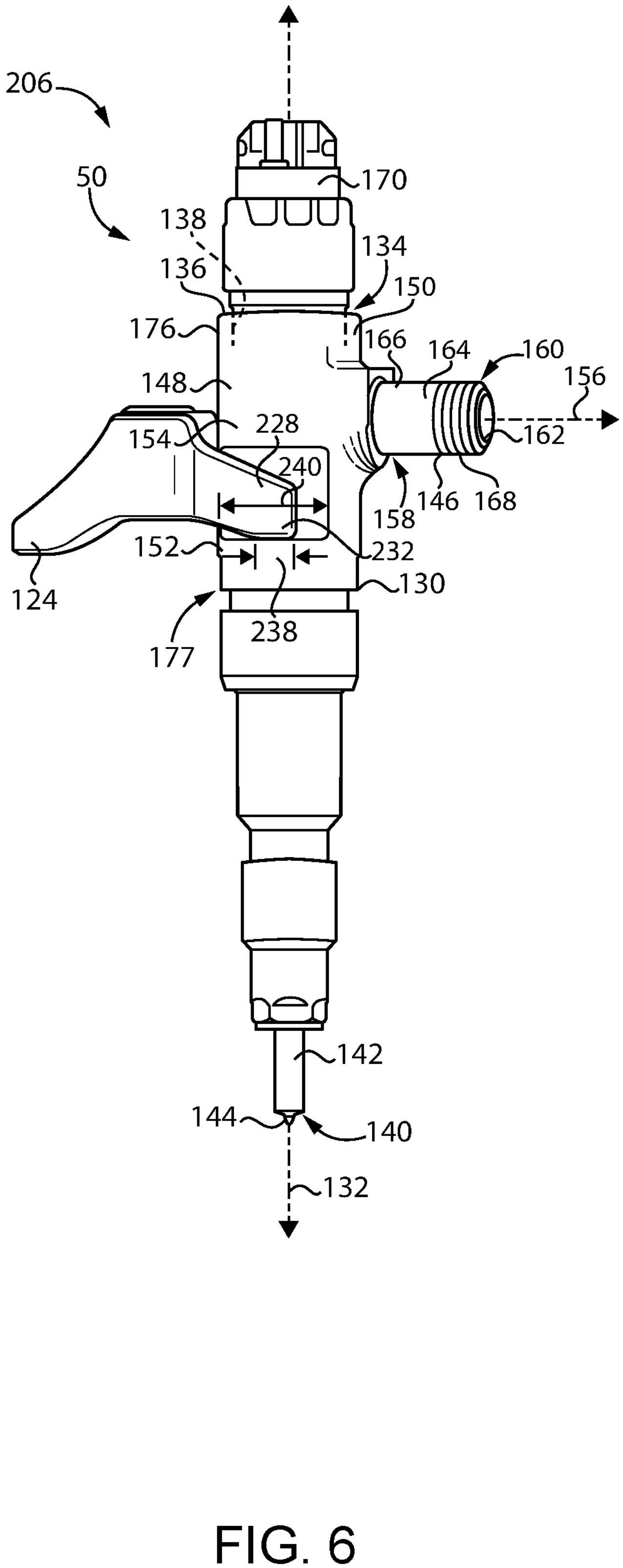
FIG. 6 is a diagrammatic view of a fuel injector assembly, according to one embodiment.
Figure 7:
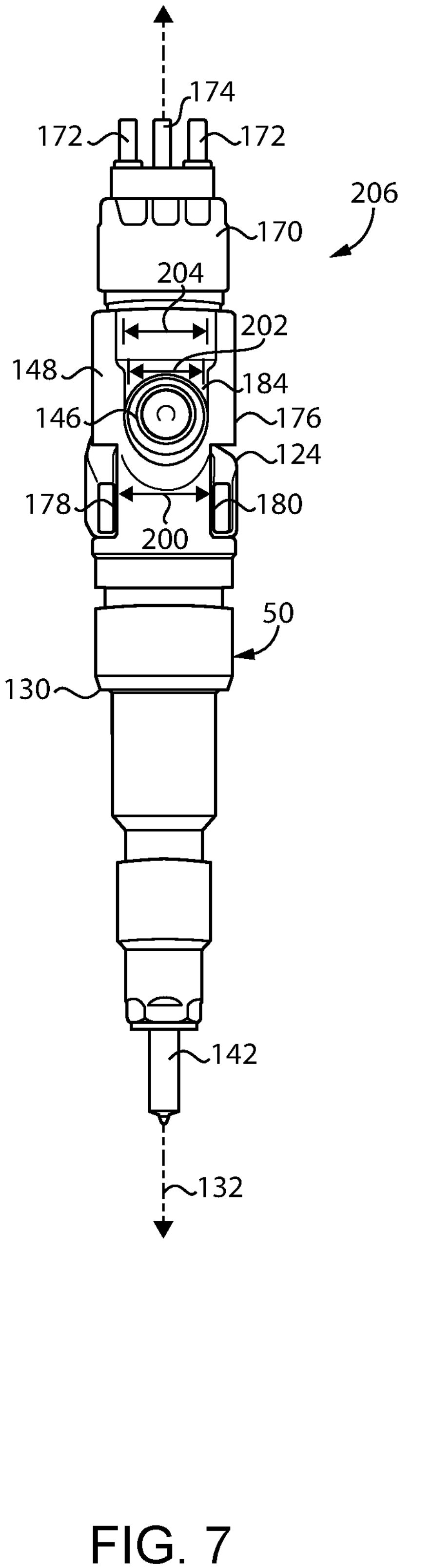
FIG. 7 is a diagrammatic view of a fuel injector assembly, according to one embodiment.

Cylinder head casting 64 further has formed therein an injector bore 72 defining an injector bore center axis 74 and extending through cylinder head casting 64 between upper surface 66 and lower surface 68. Referring also now to FIGS. 3-5, cylinder head casting 64 further includes a total of four gas exchange openings 78, 80, 82, and 84 formed in fire deck 70. In the illustrated embodiment gas exchange openings 78 and 84 include intake openings, and gas exchange openings 80 and 82 include exhaust openings. Cylinder head casting 64 further has formed therein a bolt bore 86 defining a bolt bore center axis 88 parallel to injector bore center axis 74. Cylinder head casting 64 also has formed therein a glow plug bore 92 defining a plug bore center axis 92 extending through cylinder head casting 64 between upper surface 66 and lower surface 68. The four gas exchange openings 78, 80, 82, and 84 are arranged at twelve o'clock, three o'clock, six o'clock, and nine o'clock positions, respectively, circumferentially around injector bore center axis 74.

Bolt bore 86 originates in upper surface 66 and terminates at a location inward of lower surface 68. Thus, bolt bore 86 opens at upper surface 66 but does not extend through to lower surface 68. Bolt bore 86 is positioned angularly between the twelve o'clock position and the three o'clock position, circumferentially around injector bore center axis 74. Glow plug bore 90 originates in upper surface 66 and terminates in lower surface 68, thus extends fully through cylinder head casting 64. A glow plug (not shown) of any suitable configuration can be positioned in glow plug bore 90 for conventional purposes including cold starting, with a heating element of the glow plug positioned to be impinged by a spray plume or jet of injected fuel, for instance by an outer periphery of a spray plume in some embodiments. Glow plug bore 90 is positioned angularly between the three o'clock position and the six o'clock position, circumferentially around injector bore center axis 74. It can also be noted from FIG. 1 that fuel injector 50 includes a nozzle tip 252 within combustion cylinder 18, an arrangement and structure of which are further discussed herein. Spray outlets described later are formed in nozzle tip 252.

It can also be noted from FIG. 4 in particular that bolt bore 86 may be located closer to the twelve o'clock position than to the three o'clock position, circumferentially around injector bore center axis 74. Glow plug bore 90 may be located closer to the three o'clock position than to the six o'clock position, circumferentially around injector bore center axis 74. Glow plug bore 90 defines a plug bore center axis 92 as noted above. Plug bore center axis 92 may be oriented diagonal to injector bore center axis 74, and extends between a radially outward location in upper surface 66 and a radially inward location in lower surface 68. This arrangement can be seen by comparing relative locations of glow plug bore 90 and plug bore center axis 92 in FIGS. 4 and 5.

With continued focus on FIG. 4, it can be seen that a circle 110 is defined by center axes 116, 118, 120, and 122 of each of the four gas exchange openings 78, 80, 82, and 84. In the illustrated embodiment each of bolt bore 86 and glow plug bore 90 is within circle 110. Gas exchange openings 78, 80, 82, and 84 may also be arranged in a quadrilateral pattern, a rectangular pattern in the illustrated embodiment, with injector bore 72 centered in the quadrilateral pattern. A midline 112 is defined by the four gas exchange openings 78, 80, 82, and 84. In the arrangement shown in FIG. 4 gas exchange openings 78 and 84 at the respective twelve o'clock and nine o'clock positions are upon a first side of midline 112. Gas exchange openings 82 and 80 at the respective three o'clock and six o'clock positions are upon a second side of midline 112. It will be recalled gas exchange openings 78 and 84 may be intake openings and gas exchange openings 80 and 82 may be exhaust openings. Among other things, the relatively tight and precise arrangement of the respective gas exchange openings, glow plug bore, and bolt bore enables these features and the components with which they are associated to be confined within a relatively small footprint in cylinder head assembly 35 so that intake conduit 94 and exhaust conduit 96 can be made relatively large to provide large, optimal flow areas for exchange of intake and exhaust gases while preserving optimal wall thickness, in a high power density application.

Engine system 10 and cylinder head assembly 35 may further include a clamp 124, features of which are further described herein, coupled to fuel injector 50, and a bolt 126 within bolt bore 86 and extending through clamp 124 to clamp fuel injector 50 to cylinder head 34 within injector bore 72. Also, in the illustrated embodiment fuel injector 50 is bisected by midline 112, and clamp 124 is canted relative to midline 112. An offset angle 114, circumferentially around injector bore center axis 74, is defined between midline 112 and bolt bore center axis 88, as further discussed herein.

As noted above, achieving increased power density in an internal combustion engine can create various challenges, and one such challenge relates to packaging the various components in a cylinder head assembly. Fuel system 40 is a so-called "top feed" fuel injector so must be supported and supplied with fuel, as well as electrically connected to electronic control unit 62, all from locations above cylinder head 34. To this end, a canted configuration of clamp 124 can assist in enabling fuel injector 50 to be robustly attached to cylinder head 34 while still fitting clamp 124 in and amongst valvetrain components including intake valves 52 and exhaust valves 54. Notably, relatively robust valve return springs necessitating large spring diameters can be used to ensure swift and reliable gas exchange valve closing, as may be desirable where relatively high pressures or pressure differences are experienced in combustion cylinder 18, intake conduit 94, intake conduit 96, or elsewhere in engine system 10. The canted configuration of clamp 124, further described herein, assists in fitting fuel injector 50 and clamp 124 amid the relatively large valve return springs in a tightly confined packaging space, especially valve return spring 56 associated with the respective one of intake valves 52.

As explained above, offset angle 114 is defined between midline 112 and bolt bore center axis 96. While a canted configuration of clamp 124 provides a practical implementation strategy, in other embodiments a symmetrical or non-canted clamp could be used, with surfaces engaged by the clamp on fuel injector 50 being oriented to provide offset angle 114. In still other embodiments, a bolt hole in clamp 124 could be offset, or some combination of these various features could be used. Also in a practical implementation strategy, offset angle 114 is 5° plus or minus 2.5°. With continued focus on FIG. 4, there can be seen a line 128 defined between center axes 116 and 120 of gas exchange openings 78 and 82 at the twelve o'clock and three o'clock positions, respectively. Bolt bore center axis 88 may be located radially inward of line 128, relative to injector bore center axis 74.

Referring also now to FIGS. 6-12, there are shown additional features of fuel injector 50 and clamp 124 together forming a fuel injector assembly 206. Fuel injector 50 includes an injector housing 130 defining a longitudinal axis 132. Longitudinal axis 132 will typically be colinear with injector bore center axis 74 when fuel injector assembly 206 is installed for service in cylinder head 34. Longitudinal axis 132 extends between a first axial injector end 134 including a housing axial end surface 136 extending circumferentially around an electrical connector bore 138, and a second axial injector end 140 including a downwardly extending nozzle 142 having a plurality of spray outlets 144 formed therein. Injector housing 130 further includes a fuel connector 146, and an outer housing surface 148 extending circumferentially around longitudinal axis 132. Outer housing surface 148 includes a cylindrical upper section 150 adjacent to housing axial end surface 136, a cylindrical lower section 152, and a middle section 154. Injector housing 130 may also include an upper body piece 176 having cylindrical upper section 150, cylindrical lower section 152, and middle section 154 formed thereon.

Injector housing 130 also includes, between first axial injector end 134 and second axial injector end 140, a first clamp surface 178 and a second clamp surface 180 formed on body piece 176 and extending axially between a connector axis 156 defined by fuel connector 146, and cylindrical lower section 152. Connector axis 156 may be understood as a transverse axis, and in some embodiments is oriented normal to longitudinal axis 132. Connector axis 156 extends between a first or base connector end 158 attached to middle section 154, and a second or terminal connector end 160 radially outward of outer housing surface 148, relative to longitudinal axis 132, and having a fuel inlet 162 formed therein. Fuel inlet 162 can include a conical or spherical inlet structured to engage with suitable connecting features of pressurized fuel conduit 49. Fuel connector 146 further includes an outer connector surface 164 extending circumferentially around connector axis 156 and having an unthreaded base section 166 adjacent to first connector end 158, and an externally threaded end section 168 adjacent to terminal connector end 160. As depicted in FIG. 3, pressurized fuel conduit 49 includes a nut 190 engaged with externally threaded end section 168 to clamp fuel connector 146 to pressurized fuel conduit 49 and fluidly connect fuel injector 50 to a supply of pressurized fuel, such as pressurized fuel reservoir 48.

With continued focus on FIG. 3, pressurized fuel conduit 49 may include an incoming linear section 192 arranged coaxially with fuel connector 146, parallel to midline 112, and clamped to fuel connector 146 by way of nut 190. Pressurized fuel conduit 49 may also include a second linear section 194 forming an acute angle 196 with incoming linear section 192 and arranged diagonally relative to both connector axis 156 and longitudinal axis 132, in and out of the page in FIG. 3. Pressurized fuel conduit 49 may also include a bend section 198 connecting between incoming linear section 192 and second linear section 194. The arrangement of pressurized fuel conduit 49 can assist in feeding pressurized fuel under valve cover 36 to the relatively confined space where fuel injector 50 and clamp 124 reside amongst the intake valves and exhaust valves and related apparatus.

It will be recalled electrical connector bore 138 may be formed in first axial injector end 134. In an implementation, electrical connector bore 138 could be internally threaded, and an electrical connector 170 threaded engaged to attach to injector housing 130 and body piece 176 within electrical connector bore 138. Electrical connector 170 may be located entirely within a cylinder defined by cylindrical upper section 150, enabling an electrical connection between electronic control unit 62 and one or more solenoid actuators in fuel injector 50 during installation or servicing to be performed vertically within the confined packaging space available. Electrical connector 170 may include upwardly projecting electrical prongs 172, and a centrally located dividing wall 174 arranged between upwardly projecting electrical prongs 172.

Figure 12:
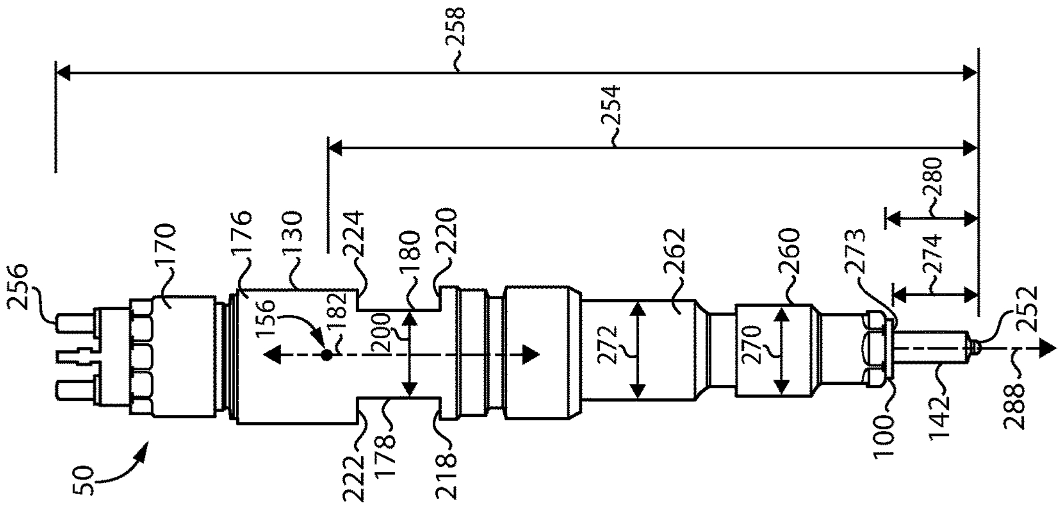
FIG. 12 is a side diagrammatic view of a fuel injector, according to one embodiment.

As described above, injector housing 130, upon body piece 176, includes first clamp face 178 and second clamp face 180. First clamp face 178 and second clamp face 180 may be planar and parallel, and define a middle plane 182 as shown in FIG. 12. Midline 112 may be within middle plane 182. Connector axis 156 and longitudinal axis 132 may also be oriented normal to one another as described above, and may each lie within middle plane 182. Connector axis 156 may be located axially between cylindrical upper section 150 and each of first clamp face 178 and second clamp face 180. Injector housing 130 further includes a connector base 184 extending peripherally around fuel connector 146 and transitioning between fuel connector 146 and each of first clamp face 178 and second clamp face 180. Fuel connector 146 and connector axis 156 may be located angularly between first clamp face 178 and second clamp face 180, circumferentially around longitudinal axis 132, and fuel connector 146 may be spaced from first axial injector end 134 by way of cylindrical upper section 150.

Figure 11:
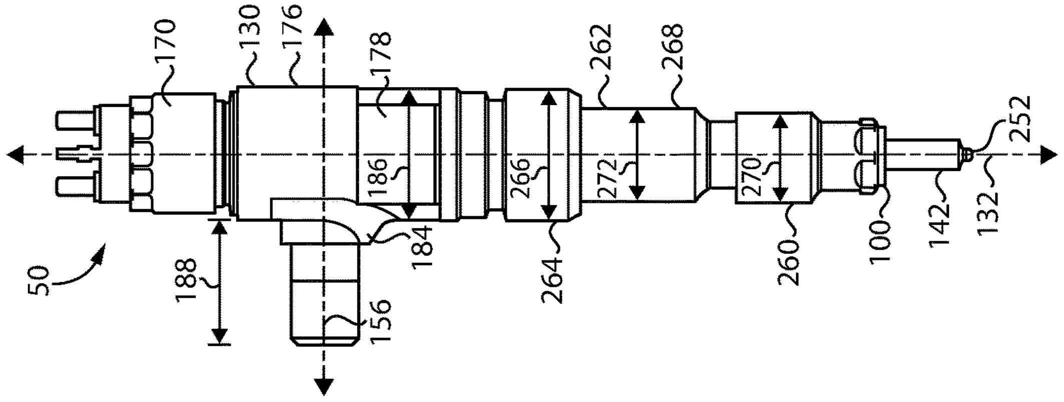
FIG. 11 is a side diagrammatic view of a fuel injector, according to one embodiment.
Figure 10:
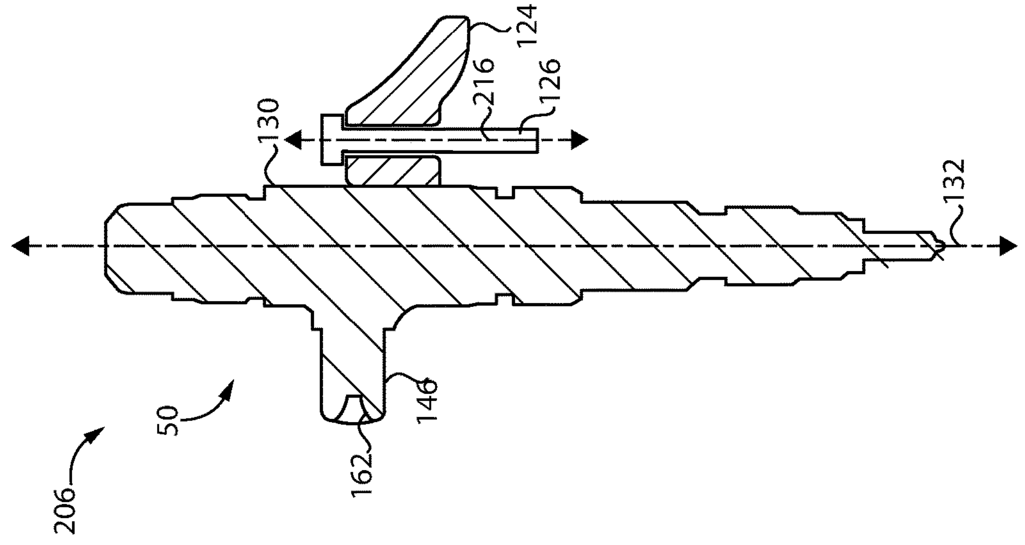
FIG. 10 is a sectioned side diagrammatic view of a fuel injector assembly, according to one embodiment.

With focus on FIGS. 11 and 12, fuel injector housing 130, within body piece 176, defines a full diameter (FD) 186 of fuel injector 50. A distance of protrusion 188 of fuel connector 146, radially outward of injector housing 130, between outer housing surface 148 and terminal connector end 160 may be equal to or greater than FD. It should also be appreciated that for purposes of the present description body piece 176 may be understood to define a longitudinal axis colinear with longitudinal axis 132, and commonly labeled. Moreover, first axial injector end 134 may also be understood as a first axial body end of body piece 176 having axial end surface 136 thereon. A second axial body end 177 of body piece 176 is shown adjacent to other injector housing components further described herein.

First clamp face 178 and second clamp face 180 may be parallel as noted above, and define middle plane 182. First clamp face 178 and second clamp face 180 may also be understood to define a minor diameter (MD) 200 therebetween. Fuel connector 146 defines a second diameter 202, as in FIG. 7, and second diameter 202 may be less than (MD) 200. Connector base 184 may define a third diameter 204 parallel to minor diameter 200. Third diameter 204 may be greater than second diameter 202 and less than MD 200. Fuel connector 146 may be partially overlapping in axial extent with each of first clamp face 178 and second clamp face 180, and positioned opposite to a bolting portion of clamp 124, circumferentially around longitudinal axis 132. First clamp face 178 and second clamp face 180 may be positioned opposite to one another circumferentially around longitudinal axis 132.

Figure 8:
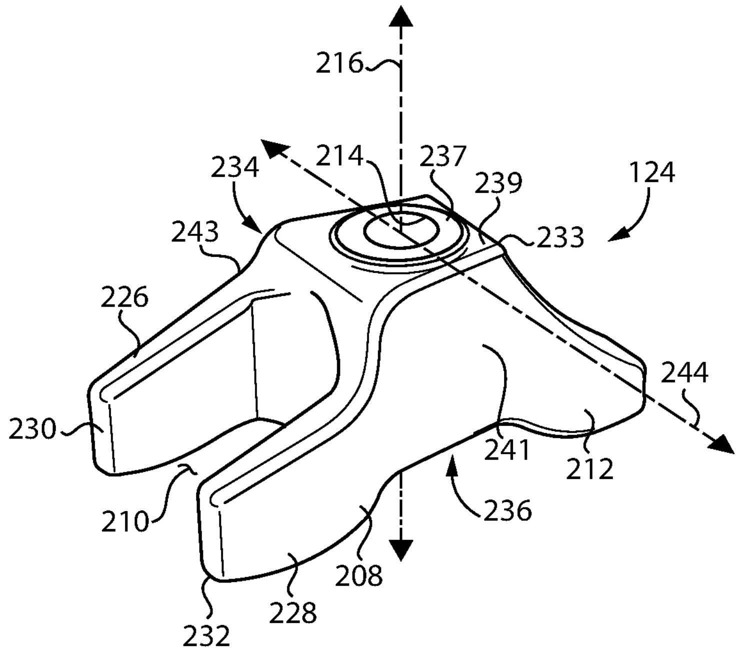
FIG. 8 is a diagrammatic view of a fuel injector clamp, according to one embodiment.
Figure 9:
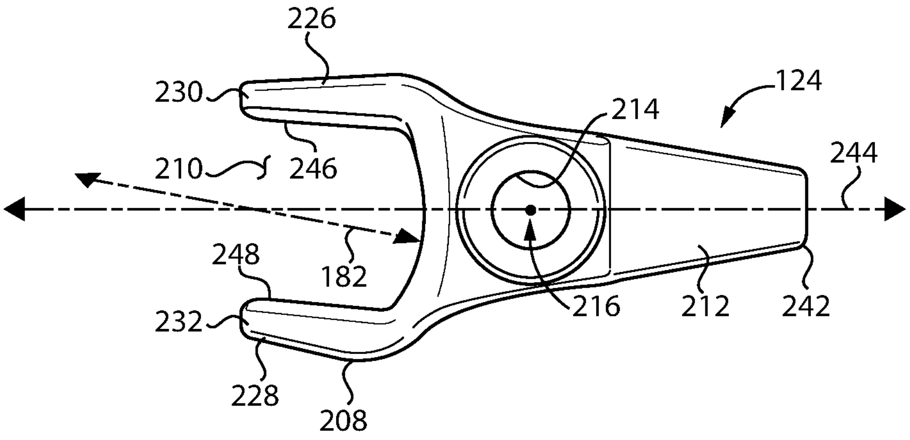
FIG. 9 is a top view of a fuel injector clamp, according to one embodiment.

Focusing now on FIGS. 8 and 9 clamp 124 includes a forked injector portion 208 forming a slot 210 receiving fuel injector 50 and in contact with each of first clamp face 278 and second clamp face 280. Clamp 124 also includes a bolting portion 212 positioned radially outward of fuel injector 50 in fuel injector assembly 206 and having a bolt hole 214 formed therein defining a bolt hole axis 216 oriented parallel to longitudinal axis 132 and offset from middle plane 182 defined by first clamp face 278 and second clamp face 280. Forked injector portion 208 may include a first prong 226 in contact with first clamp face 278 and a second prong 228 in contact with second clamp face 280. Clamp 124 also includes a center section 233 having formed thereon a bolt boss 237 extending circumferentially around bolt hole axis 216. It will be understood that bolt hole axis 216 in clamp 124 and bolt bore center axis 88 can be understood as a common bolt or bolt hole axis when injector assembly 206 is installed in cylinder head assembly 35. A peripheral surface 239 of center section 233 extends radially outward, relative to bolt hole axis 216 to a first outside surface 241 of clamp 124 and to a second outside surface 243 of clamp 124. Clamp 124 further includes a lower bolt shaft side 238 and an upper bolt head side 236. Each of first prong 226 and second prong 228 is sloped downward upon upper bolt head side 236 in a direction of first prong tip 226 and second prong tip 228, respectively. Bolting portion 212 extends from bolt hole 214 to a terminal nose 242 and defines a clamp axis 244. Clamp axis 244 extends through terminal nose 242 and through bolt hole axis 216 and is oriented diagonally to middle plane 182 in each of a longitudinal aspect and a circumferential aspect, relative to longitudinal axis 132.

As can be seen in FIGS. 11 and 12, for example, injector housing 130 further includes a first step 218 and a second step 220 each extending peripherally along first clamp face 278 and second clamp face 280, respectively. A third step 222 is opposite first step 218, and a fourth step 224 is opposite second step 220, in the illustrated embodiment. First prong 226 is in contact with first step 218 and second prong 228 is in contact with second step 220 when clamp 124 is coupled to fuel injector 50. First prong tip 230 is in axial facing contact with first step 218, and second prong tip 232 is in axial facing contact with second step 220. A contact length 238 of first prong tip 230 and second prong tip 232 to each respective first step 218 and second step 220 may be less than a majority of a full length 240 of each respective first step 218 and second step 220.

It will be recalled that gas exchange openings 78, 80, 82, and 84 define midline 112. Midline 112 may lie within a cylinder head middle plane commonly labeled with reference numeral 112 that extends vertically through cylinder head 34 and fuel injector 50. Fuel injector 50 may be bisected by the cylinder head middle plane 112. Bolt hole 214 and bolt bore 86 are coaxially arranged along common axis 216/88, which is offset from the cylinder head middle plane 112. When fuel injector assembly 206 is installed for service in cylinder head assembly 35, the cylinder head middle plane 212, fuel injector middle plane 182, and a clamp middle plane (not numbered) defined between a first inside prong surface 246 of first prong 226 and a second inside prong surface 248 of second prong 228 may all be coplanar. Returning focus to FIGS. 8 and 9, it will be recalled that clamp 124 may be canted. Canted means offset, and in the top view of FIG. 9 the canting of forked injector portion 208 relative to bolting portion 212 is readily apparent. Clamp axis 244 may be diagonal to each of first inside prong surface 246 and second inside prong surface 248, in a projection plane as depicted in FIG. 9 oriented normal to bolt hole axis 216.

Focusing now on additional proportional and dimensional attributes of fuel injector 50, it will be recalled that fuel injector 50 is structured for installation in a relatively tight packaging space amongst valvetrain components in cylinder head assembly 35. Fuel injector 50 may be relatively longer or taller relative to its diameter in comparison to certain known fuel injectors, and has various relative proportions of parts of injector housing 130 adapted for fitting into the available packaging space without compromising other factors such as functionality or serviceability. It will be recalled injector housing 130 includes a nozzle 142 having a nozzle terminal tip 252. Injector full diameter (FD) 186 is defined by body piece 176. An axial distance (AD) 254 is defined between an intersection of connector axis 156 and longitudinal axis 132, and nozzle terminal tip 252. A ratio of AD to FD may be from 4.8 to 5.1. In a refinement, the ratio of AD to FD may be from 4.88 to 5.06. In one practical implementation FD is equal to 30 millimeters within a tolerance of plus 0.8 millimeters or minus 0.0 millimeters, and AD is equal to 151.16 millimeters within a tolerance of plus 0.7 millimeters or minus 0.65 millimeters.

Electrical connector 170 may further include a connector terminal tip 256. An injector axial length (AL) 258 is defined between connector terminal tip 256 and nozzle terminal tip 252. A ratio of AL to FD may be from 6.9 to 7.2. In a refinement, the ratio of AL to FD is from 6.94 to 7.19. In a practical implementation AL is equal to 214.86 millimeters within a tolerance of plus 0.9 millimeters or minus 0.85 millimeters.

Injector housing 130 may further include a nozzle case 260, and a middle body piece 262 between nozzle case 260 and upper body piece 176. A reduced diameter (RD) 270 is defined by nozzle case 260. Middle body piece 262 may include an upper section 264 having a diameter 266 equal to FD, and a lower section 268 having a diameter 272 equal to RD. The respective diameters may be equal within tolerances applied to the injector housing diameters, hence applying tolerances associated with FD to the described relationships relative to FD means that "equal" is satisfied within plus 2×0.8 millimeters or minus 2×0.0 millimeters. From FIGS. 11 and 12 it will also be appreciated that FD is normal to MD, and that RD is greater than MD and less than FD.

Injector housing 130 may further include a locating surface 273 spaced axially inward of nozzle terminal tip 252 and extending circumferentially around nozzle 142. An exposed tip length axial distance (TL) 274 is defined between locating surface 273 and nozzle terminal tip 252. A ratio of AD to TL may be from 8.06 to 8.34. In a refinement the ratio of AD to TL may be from 8.07 to 8.32. A ratio of AL to TL may be from 11.48 to 11.86. In the illustrated embodiment, crush washer 100 forms locating surface 273. In one practical implementation TL is equal to 18.36 millimeters within a tolerance of plus 0.3 millimeters or minus 0.15 millimeters. As will be further apparent from the following description the disclosed proportional and dimensional attributes relative to elongate nozzle 142 can assist in precisely positioning nozzle terminal tip 252 within combustion cylinder 18 such that nozzle 142 will not likely overheat while also presenting spray outlet features that are matched to features of piston 20 to achieve desirable performance goals.

Figure 13:
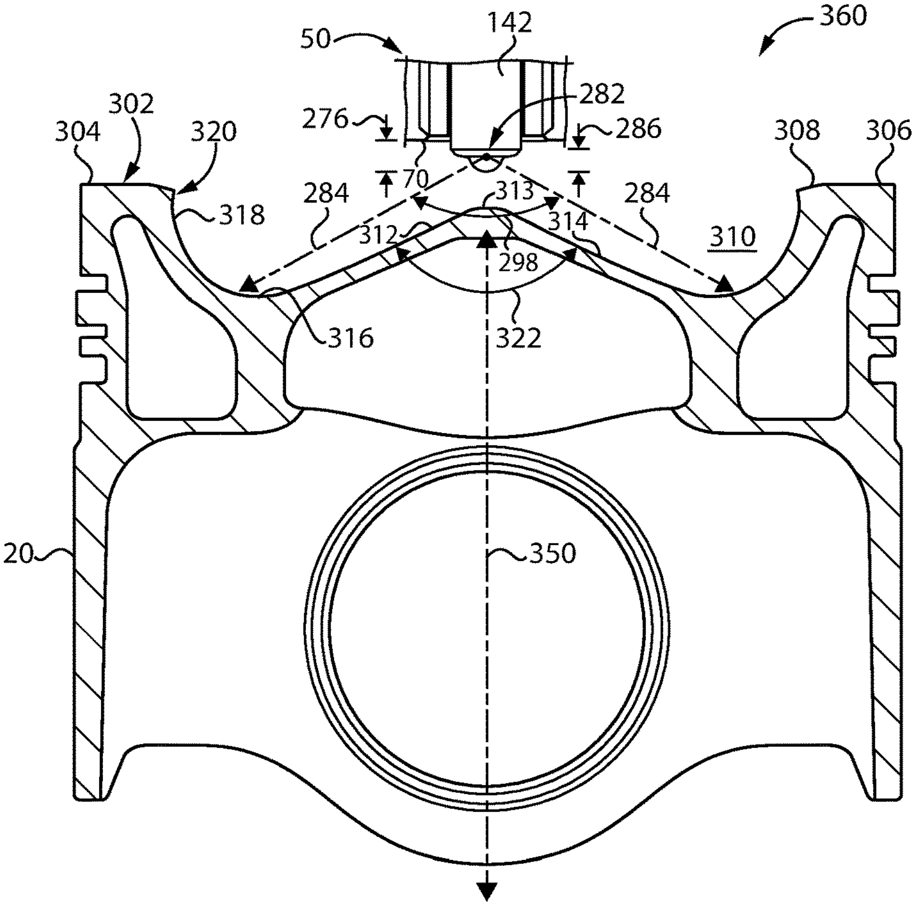
FIG. 13 is a side diagrammatic view of a combustion system, according to one embodiment.
Figure 14:
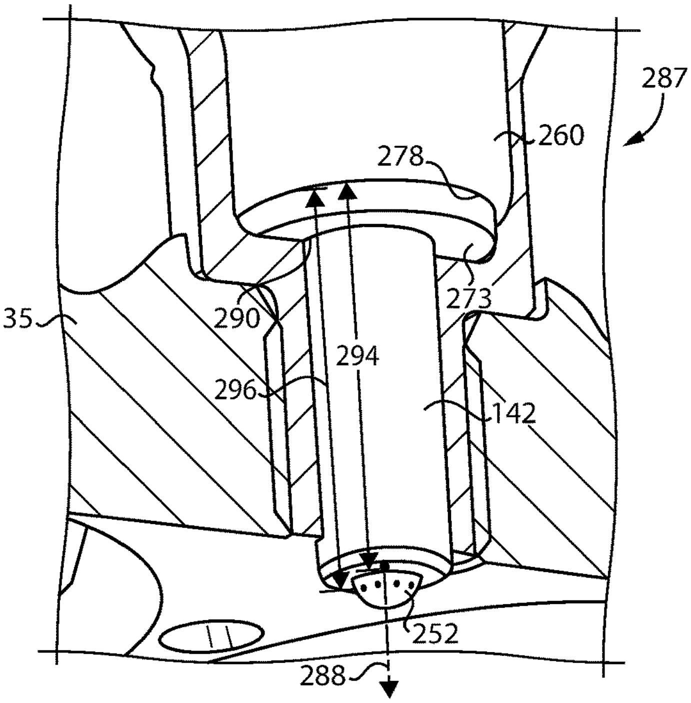
FIG. 14 is a diagrammatic view, in perspective, of a nozzle assembly for a fuel injector in a cylinder head, according to one embodiment.
Figure 15:
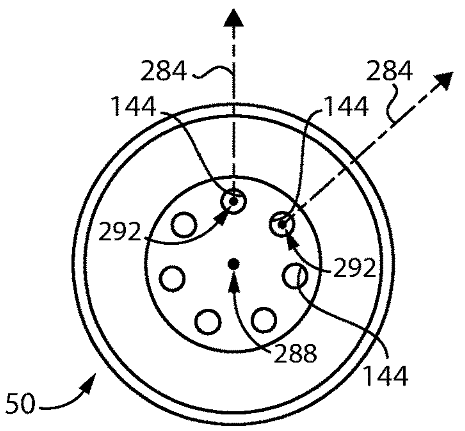
FIG. 15 is an end view of a fuel injector, according to one embodiment.

Referring also now to FIGS. 13-15 a protrusion distance (PD) 276 is defined between lower fire deck surface 70 and nozzle terminal tip 252. A ratio of TL to PD may be from 8.67 to 8.89. In one practical implementation PD is equal to 2.1 millimeters, within a tolerance of plus 0.3 millimeters or minus 0.15 millimeters, for example. Nozzle case 260 may further include an axial end surface 278. A distance 280 from axial end surface 278 to nozzle terminal tip 252 may be 19.86 millimeters, within a tolerance of plus 0.3 millimeters or minus 0.15 millimeters. It will be appreciated axial end surface 278 is a surface obscured by crush washer 100 when positioned about nozzle 142. Spray outlets 144 may be of uniform size, uniform shape such as cylindrical, and uniformly distributed about a center axis 288 defined by elongate nozzle 142. Nozzle terminal tip 252 may be hemispheric in shape as can be seen in FIGS. 13 and 14.

Spray outlets 144 may define spray axes 284 defining a spray angle of 130° plus or minus a tolerance of 0.75°, for example. Spray axes 284 may further define a spray axis apex 282 within nozzle 142. A distance 286 from spray axis apex 282 to nozzle terminal tip 252 may be 1.1 millimeters. A tip full length (FL) is defined between axial end surface 278 and nozzle terminal tip 252. Spray axes 284 may each define a center point 292 at a respective spray outlet exit location. A base-apex axial dimension (BA) 294 is defined between axial end surface 278 and spray axis apex 282. A base-center point axial dimension (BC) 296 is defined between axial end surface 278 and center points 292. A ratio of FL to BA may be from 1.06 to 1.10, and a ratio of FL to BC may be from 1.04 to 1.08. In one practical implementation FL is equal to 19.86 millimeters within a tolerance plus 0.3 millimeters or minus 0.15 millimeters.

Focusing now on FIG. 13, there is shown a combustion system 360 including fuel injector 50 and piston 20. As noted above features of fuel injector 50 including dimensions, proportions, and other geometric attributes can be understood to work cooperatively with features of piston 20 to obtain desirable and unexpectedly advantageous results. Piston 20 includes a piston end face 302 forming an annular piston rim 304 extending circumferentially around a piston center axis 350. Annular rim 304 may include an outer rim surface 306 and a sloped inner rim surface 308. In some embodiments annular rim 304 may include pockets to accommodate intake valves. Piston end face 302 further forms a combustion bowl 310 having a bowl floor 316 and a bowl outer wall 318. A center cone 312 formed by piston end face 302 is within combustion bowl 310 and defines a cone angle 322. Spray axes 284 define a spray angle 298, smaller than cone angle 322. Spray angle 298 may be 130° plus or minus 0.75°, for example. Cone angle 322 may be 140° plus or minus 0.75°, for example. A difference between spray angle 298 and cone angle 322 may be 10° plus or minus 1.5°. A peak 313 of center cone 312 is generally centered on piston center axis 350. Piston 20 further includes a reentrant protrusion 320 extending circumferentially around combustion bowl 310. Annular rim 304 and bowl outer wall 318 intersect at reentrant protrusion 320. Bowl floor 316 is radiused to form a toroidal shape and is intersected by spray axes 284 at the top dead center position of piston 20, approximately as shown in FIG. 13. In one practical implementation outer rim surface 306 is flat or planar as described, and sloped inner rim surface 308 is radiused. In a refinement, sloped inner rim surface 308 forms a chamfius, a combined chamfered and radiused profile, adjoining reentrant protrusion 320. The sloped profile of inner rim surface 308 is formed by the chamfius at least in part. Reentrant protrusion 320 may include a sharp edge that defines a radius of curvature smallest among all radiuses of curvature formed by piston end face 302. In one embodiment reentrant protrusion 320 includes a deburred edge. As further discussed herein, features of fuel injector 50 and piston 20 form a glancing spray jet impingement pattern upon center cone 312 when piston 20 is at the top-dead-center position.

INDUSTRIAL APPLICABILITY

As discussed above, features of fuel injector 50 and piston 20 can be understood to be matched to provide desirable power density, efficiency, and emissions. To these ends, positioning, orientation, and number of spray outlets 144 are highly precise relative to fire deck 70 and features of piston 20. Configuring fuel injector 50 in this manner enables spray plumes of fuel to advance in a desirable pattern that limits plume-plume interaction between adjacent spray plumes or jets of fuel, also limits interaction of any one spray plume with itself, and supports a combustion strategy that optimizes the use of available oxygen within combustion cylinder 18 even with relatively larger quantity highly pressurized fuel injections.

It has been discovered that employing a number of spray outlets greater than seven can be associated with greater risk of interaction between spray plumes and present challenges, particularly respecting emissions during transient engine conditions, resulting in excess soot production. Using more than seven outlets can be also associated with insufficient penetration of spray plumes into the cylinder for optimal combustion, at least without other compensation that can create still other challenges. It has further been discovered that use of a number of spray outlets less than seven can also present different challenges, namely, higher soot emissions generally, and likely for the reason that larger outlets result in greater penetration of spray plumes into the cylinder than is desired, resulting in potential wall wetting and/or excessive curling back of the plumes upon themselves and thus limiting exposure of the fuel to otherwise available oxygen. The use of exactly seven spray outlets configured according to the present disclosure provides a desirable balance of distribution of injected fuel into the available combustion space, providing sufficient but not excessive spray penetration while minimizing both plume-plume and intra-plume interaction risks. The features of spray outlet arrangement and number also cooperate with piston features, as further discussed below.

Figure 16:
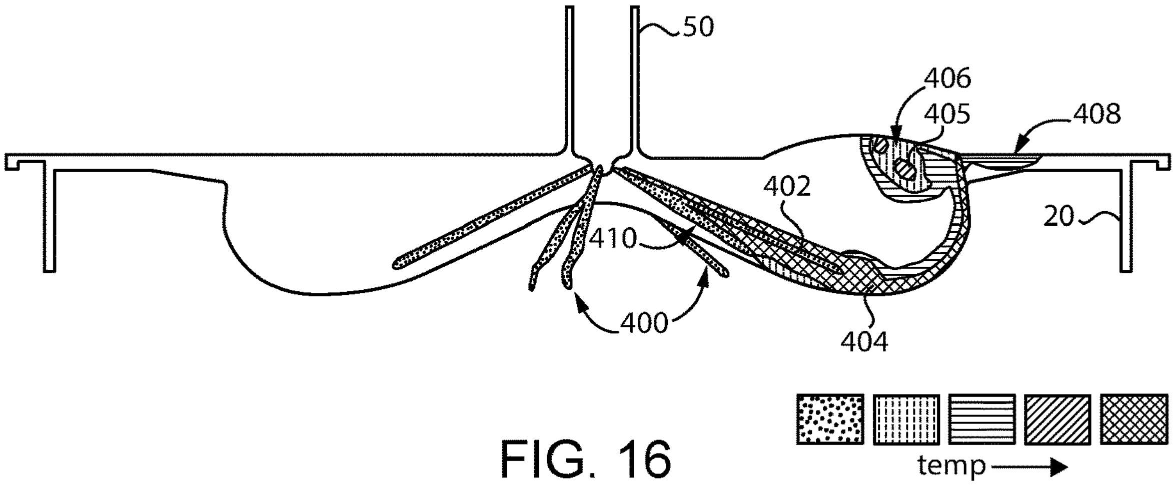
FIG. 16 is a diagrammatic view of combustion state in an engine, according to one embodiment.
Figure 17:
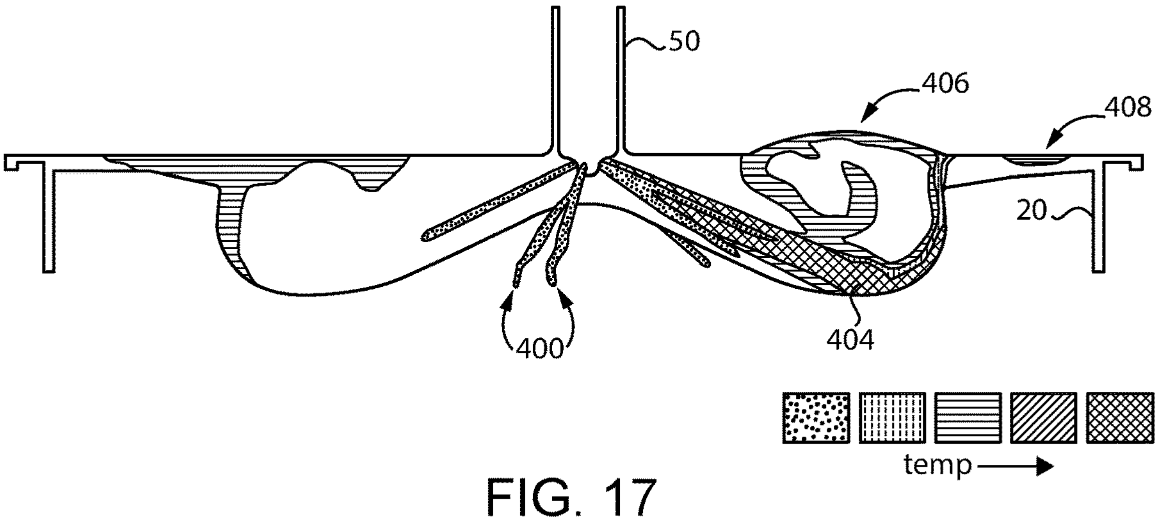
FIG. 17 is a diagrammatic view of combustion state in an engine, according to one embodiment.

Referring also now to FIGS. 16 and 17, operating engine 12 can include moving piston 20 between its bottom dead-center-position and top-dead-center position in combustion cylinder 18, and increasing in-cylinder pressure in combustion cylinder 18 based on the moving of piston 20 to an autoignition threshold for air and injected liquid fuel. Operating engine 12 can further include directly injecting the liquid fuel into combustion cylinder 18 through exactly seven spray outlets 144 in fuel injector 50 to produce spray jets advanced outwardly and downwardly from fuel injector 50 into combustion bowl 310 formed by piston end face 302.

As depicted in FIG. 16, spray jets or plumes 400 are shown as they might appear at, or just after, the top-dead-center position of piston 20, having propagated outwardly and downwardly from fuel injector 50 and first impinging at an impingement location 410 that is upon a slope of center cone 314. In particular, impingement location 410 may be within a middle one third of the slope between cone peak 313 and a bottom of combustion bowl 310 formed by bowl floor 316. Thus, at a top-dead-center position, approximately as shown in FIG. 16, spray jets 400 are targeted at a bottom of combustion bowl 310. Upon and after the initial, first impingement spray jets 400 may be understood as glancing against the slope of center cone 314. The glancing hit of spray jets 400 can be understood to initiate a gliding flow of the injected fuel along bowl surfaces, smoothly guiding the fuel while limiting any reduction in momentum that might occur as a result of a more direct impingement, and helping ensure fuel flow will continue robustly as jets 400 continue along the bowl surfaces. Put differently, the described strategy conserves momentum such that mixing of fuel and air can optimally continue late in the injection cycle.

Fuel of the glanced spray jets 400 can be guided along outer bowl surface or wall 318 upwardly toward reentrant protrusion 320. At reentrant protrusion 320 the guided fuel is split into a detached minor flow 408 that is advanced upwardly and outwardly from reentrant protrusion 320 over sloped inner rim surface 308. Forming inner rim surface 308 with a slope, and in particular with a chamfius, assists in controlling detachment of minor flow 408 so as to not be excessive, while making use of available oxygen in the space between piston rim 304 and fire deck 70. A circulated major flow 406 is advanced upwardly and inwardly from reentrant protrusion 320 toward fire deck surface 70 in engine 12. Splitting of the guided fuel can further include apportioning the guided fuel in a manner limited self re-entrainment (intra-plume interaction) of the circulated major flow. In FIGS. 16 and 17 regions of fuel shown at 402 are not yet combusting or have just begun to combust, while regions shown at 404 are actively combusting and at high temperatures. Regions shown at 405 are still actively combusting but proceeding to somewhat cooler temperatures as combustion approaches completion.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A cylinder head comprising:

a cylinder head casting including an upper surface, a lower surface forming a fire deck, and having formed therein an injector bore defining an injector bore center axis and extending through the cylinder head casting between the upper surface and the lower surface, and four gas exchange openings in the fire deck;

the cylinder head casting further having formed therein a bolt bore defining a bolt bore center axis parallel to the injector bore center axis, and a glow plug bore extending through the cylinder head casting between the upper surface and the lower surface;

the four gas exchange openings are arranged at twelve o'clock, three o'clock, six o'clock, and nine o'clock positions, respectively, circumferentially around the injector bore center axis when viewed from above the cylinder head casting;

the bolt bore originating in the upper surface and terminating at a location inward of the lower surface, and positioned angularly between the twelve o'clock position and the three o'clock position, circumferentially around the injector bore center axis;

the glow plug bore originating in the upper surface and terminating in the lower surface, and positioned angularly between the three o'clock position and the six o'clock position, circumferentially around the injector bore center axis; and wherein a circle is defined by center axes of each of the four gas exchange openings, and wherein each of the bolt bore and the glow plug bore is within the circle.

2. The cylinder head of claim 1 wherein the bolt bore is located closer to the twelve o'clock position than to the three o'clock position, circumferentially around the injector bore center axis.

3. The cylinder head of claim 2 wherein the glow plug bore is located closer to the three o'clock position than to the six o'clock position, circumferentially around the injector bore center axis.

4. The cylinder head of claim 3 wherein the glow plug bore defines a plug bore center axis diagonal to the injector bore center axis, and extends between a radially outward location in the upper surface and a radially inward location in the lower surface.

5. The cylinder head of claim 1 wherein:

a midline is defined by the four gas exchange openings;

the gas exchange openings at the twelve o'clock and nine o'clock positions are upon a first side of the midline;

the gas exchange openings at the three o'clock and six o'clock positions are upon a second side of the midline; and an offset angle of 5° plus or minus 2.5° circumferentially around the injector bore center axis, is defined between the midline and the bolt bore center axis.

6. An engine system comprising:

an engine housing including a cylinder block and a cylinder head forming a combustion cylinder;

a piston movable in the combustion cylinder between a bottom dead center position and a top dead center position to increase in-cylinder pressure to an autoignition threshold for air and an injected liquid fuel;

a fuel injector including a nozzle tip within the combustion cylinder, and spray outlets formed in the nozzle tip;

the cylinder head including an upper surface, a lower surface forming a fire deck, and having formed therein an injector bore defining an injector bore center axis, and four gas exchange openings in the fire deck;

the four gas exchange openings are arranged at twelve o'clock, three o'clock, six o'clock, and nine o'clock positions, respectively, circumferentially around the injector bore center axis when viewed from above the cylinder head;

the cylinder head further having formed therein a bolt bore defining a bolt bore center axis, positioned angularly between the twelve o'clock position and the three o'clock position, circumferentially around the injector bore center axis, and a glow plug bore positioned angularly between the three o'clock position and the six o'clock position, circumferentially around the center axis;

a clamp coupled to the fuel injector; and a bolt within the bolt bore and extending through the clamp to clamp the fuel injector to the cylinder head within the injector bore.

7. The engine system of claim 6 wherein a midline is defined by the four gas exchange openings, and an offset angle, circumferentially around the injector bore center axis, is defined between the midline and the bolt bore center axis.

8. The engine system of claim 7 wherein the fuel injector is bisected by the midline, and the clamp is canted relative to the midline.

9. The engine system of claim 7 wherein the offset angle is 5°, plus or minus 2.5°.

10. The engine system of claim 7 wherein:

the gas exchange openings at the twelve o'clock and nine o'clock positions include an exhaust opening and an intake opening, respectively, upon a first side of the midline; and the gas exchange openings at the three o'clock and six o'clock positions include an intake opening and an exhaust opening, respectively, upon a second side of the midline.

11. The engine system of claim 7 wherein the bolt bore is located closer to the twelve o'clock position than to the three o'clock position, circumferentially around the injector bore center axis.

12. The engine system of claim 11 wherein a line is defined between center axes of the gas exchange openings at the twelve o'clock and three o'clock positions, and the bolt bore center axis is located radially inward of the line, relative to the injector bore center axis.

13. The engine system of claim 7 wherein the glow plug bore is located closer to the three o'clock position than to the six o'clock position, circumferentially around the injector bore center axis.

14. The cylinder head of claim 7 wherein the glow plug bore defines a plug bore center axis diagonal to the injector bore center axis, and extends between a radially outward location in the upper surface and a radially inward location in the lower surface.

15. The cylinder head of claim 7 wherein a circle is defined by center axes of each of the four gas exchange openings, and each of the bolt bore and the glow plug bore is within the circle.

16. A cylinder head comprising:

a cylinder head casting including an upper surface, a lower surface forming a fire deck, and having formed therein an injector bore defining an injector bore center axis and extending through the cylinder head casting between the upper surface and the lower surface, and four gas exchange openings in the fire deck;

the cylinder head casting further having formed therein a bolt bore defining a bolt bore center axis parallel to the injector bore center axis;

the four gas exchange openings are arranged at twelve o'clock, three o'clock, six o'clock, and nine o'clock positions, respectively, circumferentially around the injector bore center axis when viewed from above the cylinder head casting; and the bolt bore being positioned angularly between the twelve o'clock position and the three o'clock position, circumferentially around the injector bore center axis, and closer to the twelve o'clock position than to the three o'clock position.

17. The cylinder head of claim 16 wherein a circle is defined by center axes of each of the four gas exchange openings, and the bolt bore is within the circle.

18. The cylinder head of claim 17 wherein a line is defined between center axes of the gas exchange openings at the twelve o'clock and three o'clock positions, and the bolt bore center axis is located radially inward of the line, relative to the injector bore center axis.

19. The cylinder head of claim 18 wherein the four gas exchange openings define a midline, and an offset angle is defined, circumferentially around the injector bore center axis, between the midline and the bolt bore center axis.

* * * * *